US006370131B1

(12) United States Patent
Miya

(10) Patent No.: US 6,370,131 B1
(45) Date of Patent: Apr. 9, 2002

(54) CDMA RADIO MULTIPLEX TRANSMITTING DEVICE AND A CDMA RADIO MULTIPLEX RECEIVING DEVICE

(75) Inventor: Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/576,250

(22) Filed: May 24, 2000

Related U.S. Application Data

(62) Division of application No. 09/000,947, filed on Dec. 30, 1997.

(51) Int. Cl.[7] ............................................... H04B 7/216
(52) U.S. Cl. ........................ 370/335; 370/342; 370/491
(58) Field of Search ................................ 370/342, 320, 370/310, 343, 326, 328, 335, 491, 479, 480, 441, 321, 337; 435/517; 375/200, 231

(56) References Cited

U.S. PATENT DOCUMENTS

| | | | | |
|---|---|---|---|---|
| 5,191,576 A | * | 3/1993 | Pommier | 370/312 |
| 5,420,850 A | * | 5/1995 | Umeda | 370/342 |
| 5,519,730 A | * | 5/1996 | Jasper | 370/207 |
| 5,559,789 A | * | 9/1996 | Nakano | 370/342 |
| 5,673,260 A | | 9/1997 | Umeda et al. | |
| 5,920,817 A | | 7/1999 | Umeda et al. | |
| 6,097,711 A | * | 8/2000 | Okawa | 370/335 |

FOREIGN PATENT DOCUMENTS

JP  5-276132  10/1993

OTHER PUBLICATIONS

English Language Abstract of JP 5–276132.

Article entitled "Performance of Coherant RAKE Detection Using Interpolation on DS/CDMA" by Higashi et al., at pp. 57–62 of *The Institute of Electronics Information And Communciation Engineers (IEICE)*, (*IEICE*) *Technical Report of IEICE*, A–P94–74, RCS94–98 (Oct. 1994), along with an English Language Abstract.

Article by Seiichii Sampei, entitled "Rayleigh Fading Compensation Method for 16QAM MODEM in Digital Land Mobile Radio Systems", at pp. 7–15 of *IEICE* B–II vol. J72–BII (1989).

IEEE 47th, Vehicular Technology Conference Proceedings, Technology in Motion, vol. 2, entitled "CDMA/TDD Cellular Systems for the 3rd Generation Mobile Communication", May 4–7, 1997 by Miya et al.

* cited by examiner

*Primary Examiner*—Douglas Olms
*Assistant Examiner*—Ricardo M. Pizarro
(74) *Attorney, Agent, or Firm*—Greenblum & Bernstein, P.L.C.

(57) ABSTRACT

In the CDMA Radio Multiplex Transmission, transfer function of line is inferred by using common pilot signal and synchronous detection is performed accordingly. The transmitting end transmits by periodically inserting pilot symbols into one channel only of multiplexed channels. The receiving end infers line condition (transfer function) from the received pilot symbols and, on the basis of the information thus obtained, performs synchronous detection of each channel multiplexed.

18 Claims, 14 Drawing Sheets

CDMA RADIO MULTIPLEX TRANSMITTING DEVICE AND A CDMA RADIO MULTIPLEX RECEIVING DEVICE

This is a division of U.S. patent application Ser. No. 09/000,947, filed Dec. 30, 1997, the contents of which are expressly incorporated by reference herein in its entirety.

BACKGROUND OF THE INVENTION

1. Field of the Invention

This invention relates to the CDMA radio multiplex transmitting device and the CDMA radio multiplex receiving device used for digital cellular communication or the like.

2. Description of the Related Art

A multiple access system is a line access system for plural stations to communicate in the same band at the same time, and one of the multiple access systems is a CDMA (Code Division Multiple Access) system. The CDMA system is a technology for multiple-accessing by spread spectrum spreading communication transmitting spectrum of an information signal spread into a fairly wide band width comparing to the original information band width. This is also called as Spread Spectrum Multiple Access (SSMA). A system multiplying a spreading sequence code as it is, by an information signal for the purpose of spread spectrum spreading is called as a direct spreading CDMA system. In the direct spreading CDMA system, it is required to make strength of both an interference wave (communication wave from other station) and a desired wave identical at a receiving end in order that plural communications can jointly have the same frequency band. This is generally called as near and far problems. Solution of this far to near problem is a prerequisite for realization of a CDMA transmission system.

The near and far problems noticeably arise for the reception in a base station which receives radio waves from many stations (mobile stations, etc.) in different locations at the same time. Hence arises a necessity for mobile stations to execute a transmitter power control according to the condition of each transmission line.

Further, in radio communication system, a TDD (Time Division Duplex) system is known which tries to improve frequency utilization efficiency by using the same frequency band for both transmitting and receiving ends. The TDD system is also called as a ping-pong system which is a system for communicating by time-sharing the same radio frequency for both transmission and reception.

Still further, among detection systems in digital communication, a synchronous detection system has an excellent static characteristics compared to a delay detection system and it is a system where Eb/10 necessary for obtaining a certain average bit error rate (BER) is the lowest. As a system for compensating distortion of transmitting signals by fading, an insertion type synchronizing system is proposed ("a system for compensating phasing distortion of 16QAM for land mobile communication" by Mr. Seiichi Mihei, transactions of IEICE, B-11 Vol.J72-B-11 No.1 pp. 7–15, 1989). In this system, a pilot symbols is periodically inserted into an information symbol to be transmitted and a detection is executed by inferring a transfer function of channel, that is to say, a line condition. Also, a system adopting the above described system to the direct spreading CDMA is proposed ("Characteristics of an insertion type synchronizing system in DS/CDMA" by Messrs. Azuma, Taguchi and Ohono, IEICE, technical report RCS94–98, 1994).

While, as a system making a synchronous detection possible in the direct spreading CDMA, there is a pilot channel. This is a system transmitting always independently from a channel which transmits the information data by making one channel (spreading code) as a reference signal for detection. An example of channel format is shown in FIG. 1. Synchronous detection of the information data is executed on the basis of an inferred phase by inferring a phase of a channel which transmits the information data from a signal of a inversely spread pilot channel. In this case, there are instances where a pilot signal (PL signal) is transmitted in a strong electric power to improve its reliability compared to a channel transmitting other information data, etc.

In the direct spreading CDMA, there is a multi code transmission which is a system where an information exceeding an information transmitting speed per one channel (one spreading code) is transmitted. This is a system where, by allotting to one user plural channels, that is to say, a plurality of spreading codes, the transmitting end multiplexes and transmits the information data by dividing it into plural channels. In the case where a synchronous detection is performed in the multi code transmission, it is supposed that said pilot symbols or pilot channel is used.

FIG. 2 shows an example of a channel format wherein the multicode transmission is performed by using the pilot symbols. The information data is transmitted by using N+1 channels (spreading codes 0~N). A pilot symbols (pilot signal) 1201 is inserted into each channel at an interval of T period. Accordingly, it is possible that the receiving end executes a synchronous detection per each channel by using the pilot symbols.

However, in the above described conventional multi code transmission, a transmitter power of the pilot symbols is identical with the information data. Also, there is interference with the pilot symbols, particularly an effect of the interrelation among spreading codes, and for this reason it is difficult to perform a highly reliable synchronous detection.

While, FIG. 3 illustrates an example of a signal format in the case where the multi code transmission is performed by using the pilot channel. The receiving end executes a phase inference from a signal of a inversely spread pilot channel and, on the basis of the inferred phase, executes a synchronous detection of the information data in channels 1-N. However, in this case, since the PL signal is transmitted through the pilot channel in the information data transmitting period of channels 1-N, the information data signal is interfered with the PL signal. Also, the PL signal is interfered with the information data. Especially in the case where the PL signal is transmitted by an electric power higher than an information data transmitting channel so as to improve its reliability, a significant interference is caused.

SUMMARY OF THE INVENTION

The present invention is made in the light of the above described situation and its object is to provide an excellent transmitting device and its receiving device which can improve performance of a synchronous detection by improving reliability of a pilot symbols in a CDMA radio multiplex transmission.

In order to realize the above described object of the present invention, it is so arranged that the transmitting end transmits by periodically inserting the pilot symbols into one channel (one spreading code) only which is multiplexed in the multi code transmission. While, the receiving end infers a line condition (transfer function) from the pilot symbols received and, on the basis of the information thus obtained, a synchronous detection of each channel multiplexed is preferred.

Particularly, it is so arranged that a transmitting data is not transmitted by other channel in a pilot transmitting period. Or again, it is so arranged that the transmitting data is transmitted by other channel in the pilot transmitting period to the extent that reliability of the pilot symbols is not damaged largely (within a limit tolerable for practical use).

According to the present invention, at the transmitting end, interference with a pilot channel can be reduced by transmitting the pilot symbols by inserting it into one channel only. Also, at the receiving end, reliability of the pilot symbols is increased due to reduction in interference with the pilot symbols, as a result of which the synchronous detection of all multiplexed channels becomes possible, thereby improving a detection performance.

DESCRIPTION OF THE PREFERRED EMBODIMENTS

Now, the embodiments of the present invention will be concretely described as follows, referring to drawings attached hereto:
(The First Embodiment)

Figure 1:
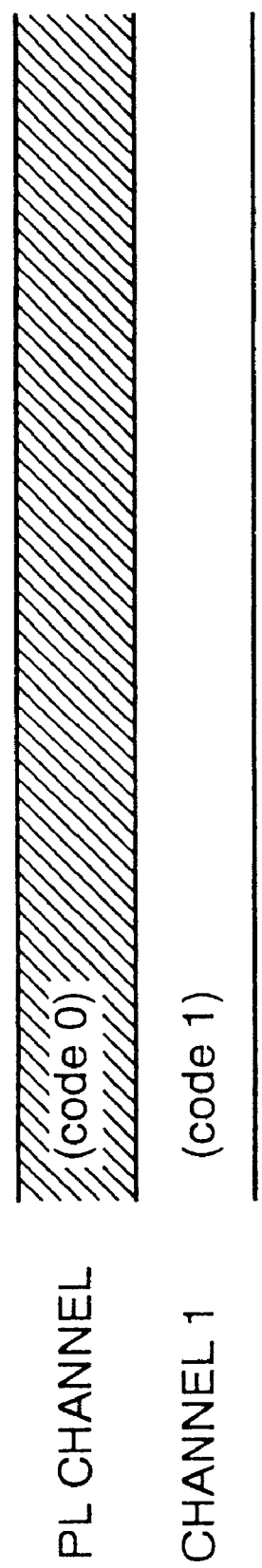
FIG. 1 is a model type view showing an example of a transmission by a pilot channel.
Figure 2:
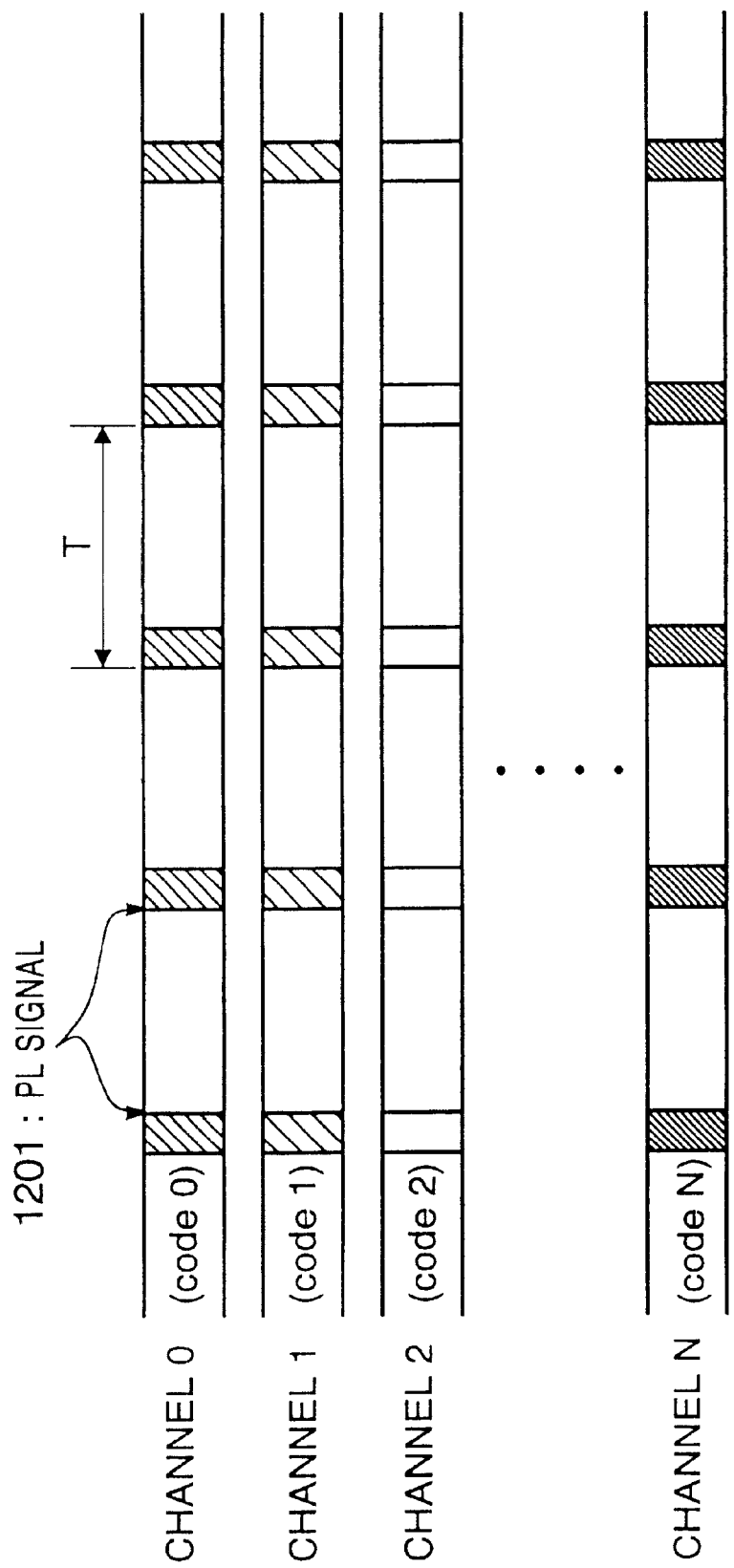
FIG. 2 is a model type view of a channel format in a conventional multi cord transmission using a pilot channel.
Figure 3:
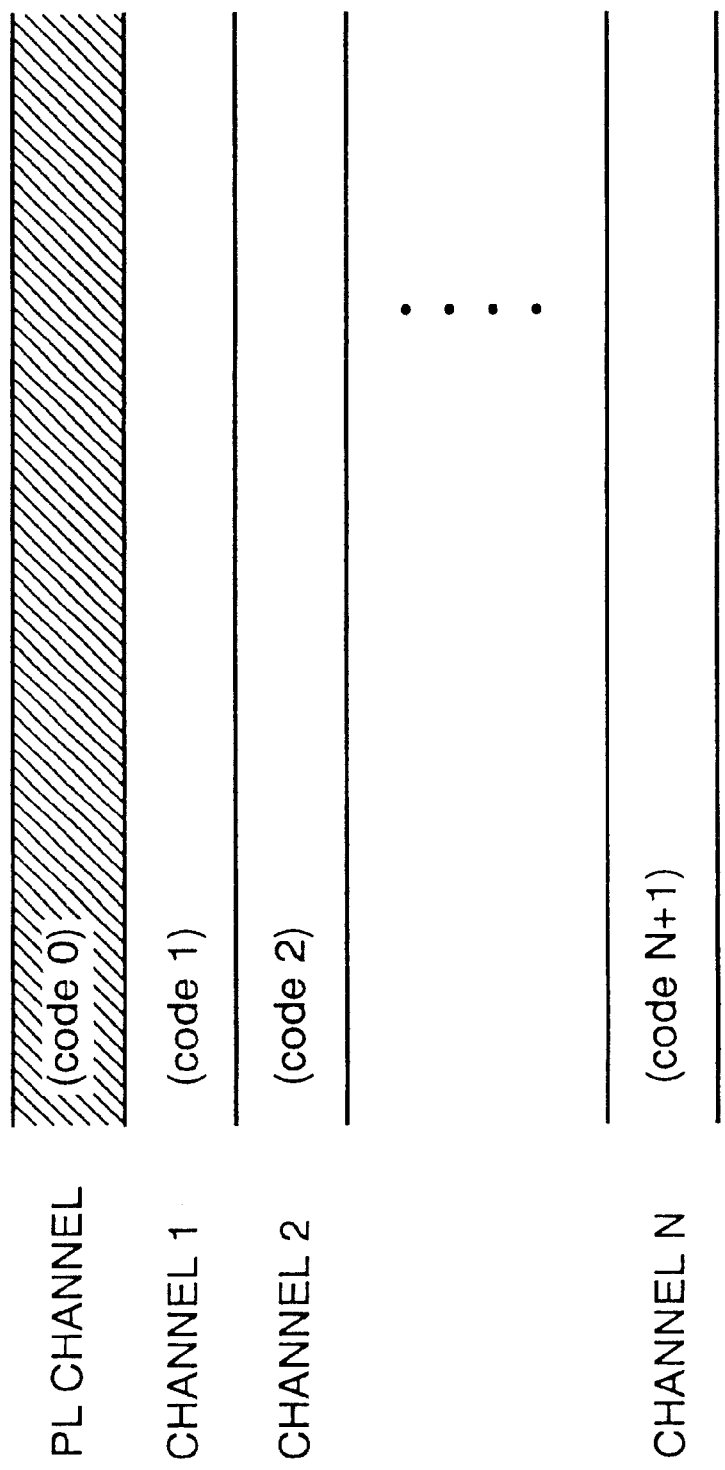
FIG. 3 is a model type view of a channel format in a conventional multi cord transmission using the pilot channel.
Figure 4:
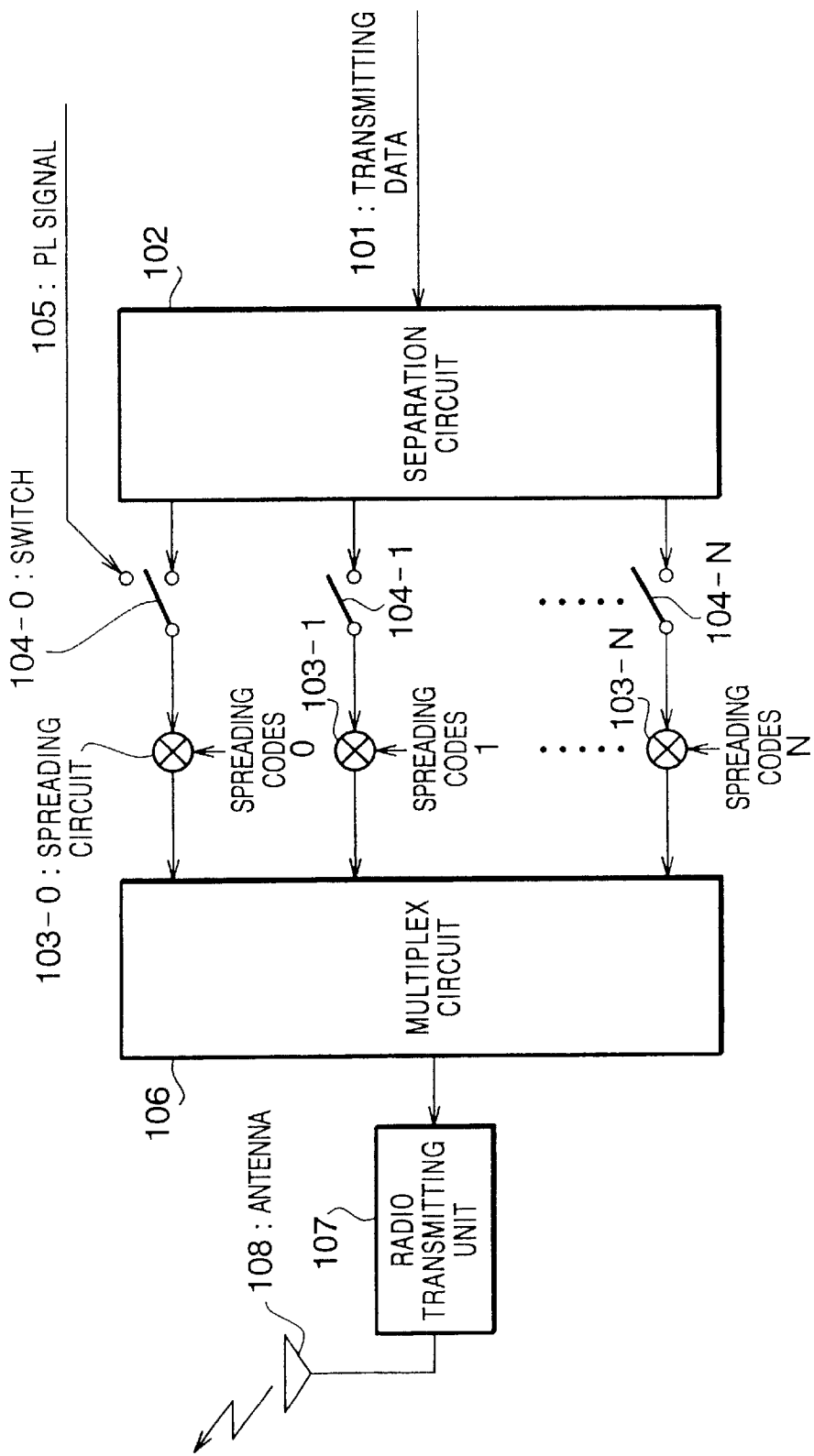
FIG. 4 is a block diagram, showing a constitution of a CDMA Radio Multiplex Transmitting Device related to the first embodiment of the present invention.

FIG. 4 is a functional block diagram of a transmitting end in a CDMA Radio Multiplex Communication Device related to the first embodiment of the present invention. In the following description, the transmitting end of the CDMA radio multiplex communication device is referred to as a CDMA radio multiplex transmitting device and a receiving end is referred to as a CDMA radio multiplex receiving device.

The CDMA radio multiplex transmitting device as shown in the drawing is provided with a separation circuit 102 which is supplied with a transmission data 101, a plurality of spreading circuits (103-0~103-N) connected in parallel with separated outputs from the separation circuit 102, a plurality of switches 104 (104-0~104-N) disposed respectively between a parallel output of the separation circuit 102 and a plurality of the spreading circuits 103, a multiplex circuit 106 which is supplied with output signals from each of the spreading circuits 103, a radio transmitting part 107 connected with output from the multiplex circuit 106, and an antenna 108 which is supplied with RF signal from the radio transmitting unit 107.

A plurality of the spreading circuits 103 are prepared only in number corresponding to a plurality of spreading codes 0~N which are assigned to users practicing the multi code transmission. Especially, a spreading circuit 103-0 assigned with a spreading code 0 is so comprised that a PL signal 105 is input via a switch 104-0. The switch 104-0 connects selectively with a terminal which is supplied with a PL signal 105 for the spreading circuit 103 and a terminal which is supplied with the transmitting data 101. A switchover timing for the switch 104 will be described later.

In the CDMA radio multiplex transmitting device constructed as described above, the transmitting data 101 is separated into (N+1) channels by the separation circuit 102. A signal of each channel is spread into the spreading circuit 103 having different spreading code and multiplexed by the multiplex circuit 106.

The pilot symbols (PL signal) 105 is inserted into a channel with a spreading code 0 by the switch 104-0 at an interval of T period. There is no transmission signal of other channel available in an insertion period(section) of the pilot symbols. Therefore, the switch 104-0 is so controlled in such manner that a transmission signal available in this section is only the pilot symbols.

Figure 5:
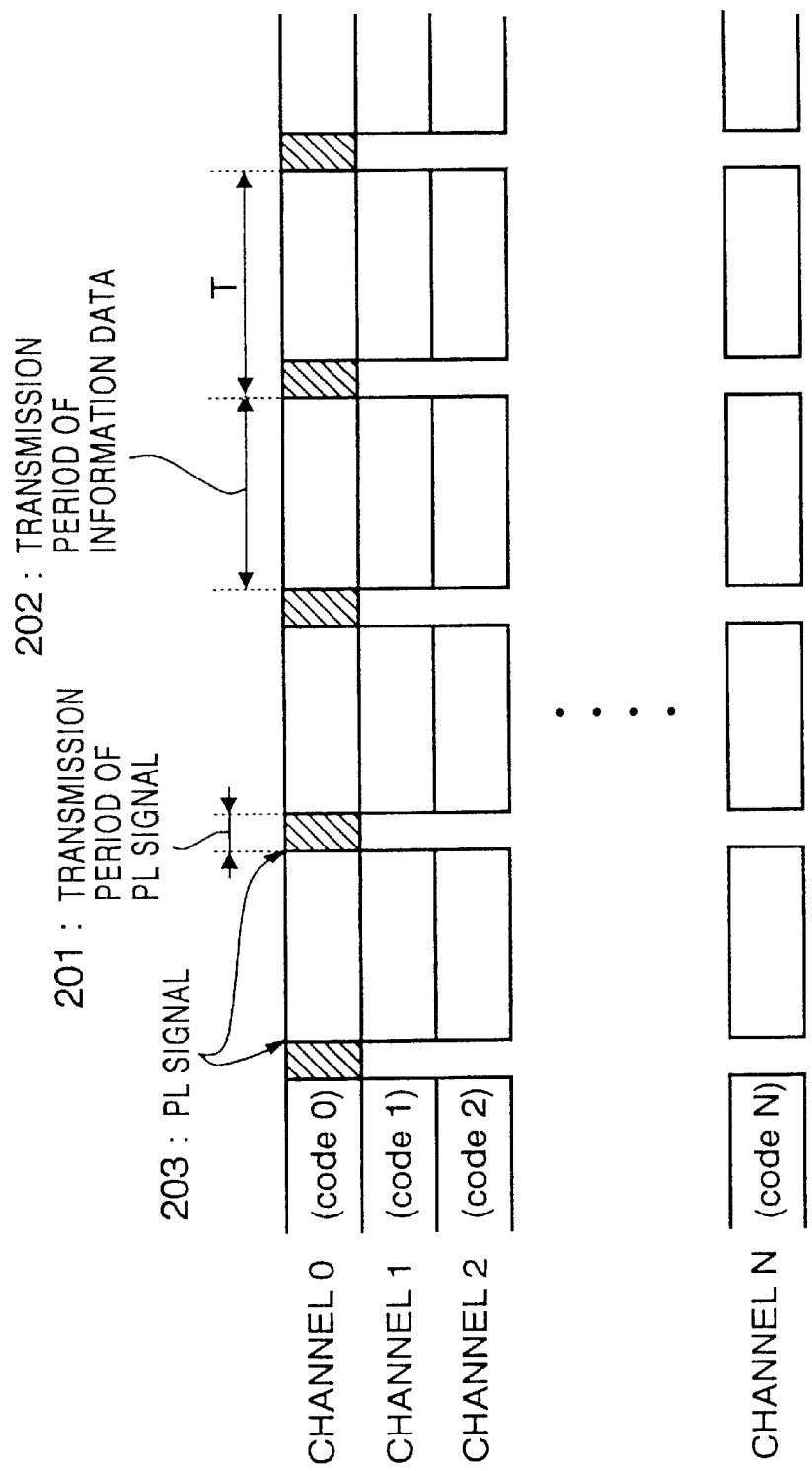
FIG. 5 is a model type view, showing an example of a format chart in the first embodiment.

FIG. 5 shows a channel format in the multi code transmission of the present embodiment. The channel format in the multi code transmission is so arranged that a PL signal transmission period 201 which is a period for transmitting a PL signal and the information data transmission period 202 which is a period for transmitting the information data such as a sound information or the like are repeated periodically. A PL signal 203 is inserted into the PL signal transmission period 201.

When the PL signal transmission period 201 begins, the switch 104-0 of the channel having the spreading code 0 is switched over so that the PL signal 105 is input to the spreading circuit 103-0 which is assigned with the spreading code 0. While, other switches 104-1~104-N are separated from each output of the separation circuit 102. This aspect is kept until the PL signal transmission period 201 ends. As a result, there arises a situation in the PL transmission period 201 where the PL signal 203 alone is transmitted in one channel and the transmission data 101 is not transmitted in other channel.

At the same time the PL signal transmission period 201 ends, an information data transmission period 202 begins. When the information data transmission period 202 begins, the switch 104-0 having the spreading code 0 is switched over so that a transmitting signal output from the separation channel 102 is input to the spreading circuit 103-0 which is assigned with the spreading code 0. While, other switches 104-1~104-N are switched over so that transmitting signals of other channels which are output from the separation circuit 102 are input to corresponding spreading circuits 103-1~103-N. This aspect is kept until the information data transmission period 202 ends.

Signals of (N+1) channels output from (N+1) spreading circuits 103-0~103-N are multiplexed by the multiplex circuit 106 and the PL signal 203 of the spreading code 0 alone is transmitted at an interval of T period.

Signals multiplexed by the multiplex circuit 106 are modulated by the radio transmitting unit 107 and transmitted by an antenna 108 after being up-converted to transmission frequency.

Figure 6:
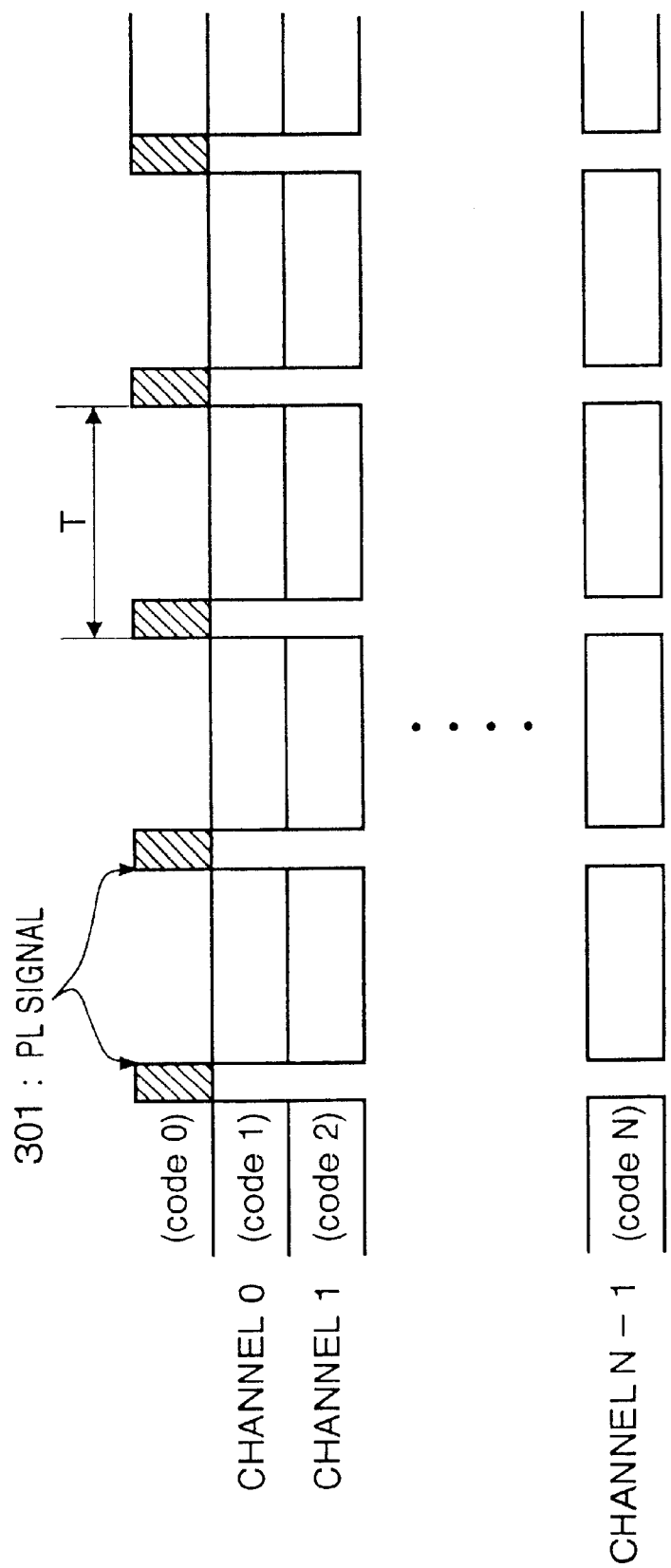
FIG. 6 is a model type view, showing an example of a format chart in a modified version of the first embodiment.

As for a spreading code used for the PL signal, it is all right if it is other than a sign used for a spreading of a transmission data and it is apparent that a system giving an independent spreading code to the PL signal 301 may be allowable as an example shown in FIG. 6.

According to the above described embodiment, the transmitting end can reduce interference with the pilot channel by transmitting the pilot symbols inserted into one channel only. Also, the receiving end can increase reliability of the pilot symbols because of reduction in the interference with the pilot symbols and, as a result, a synchronous detection of all multiplexed channels becomes possible, thereby improving a detection performance.

(The Second Embodiment)

The second embodiment according to the present invention is an example of a CDMA radio multiplex receiving device which forms a receiving end in a CDMA radio multiplex communication device of the above described first embodiment. This CDMA radio multiplex receiving device performed a synchronous detection of a data transmitted by radio communication from the same CDMA Radio Multiplex Transmitting Device as that of the first embodiment.

Figure 7:
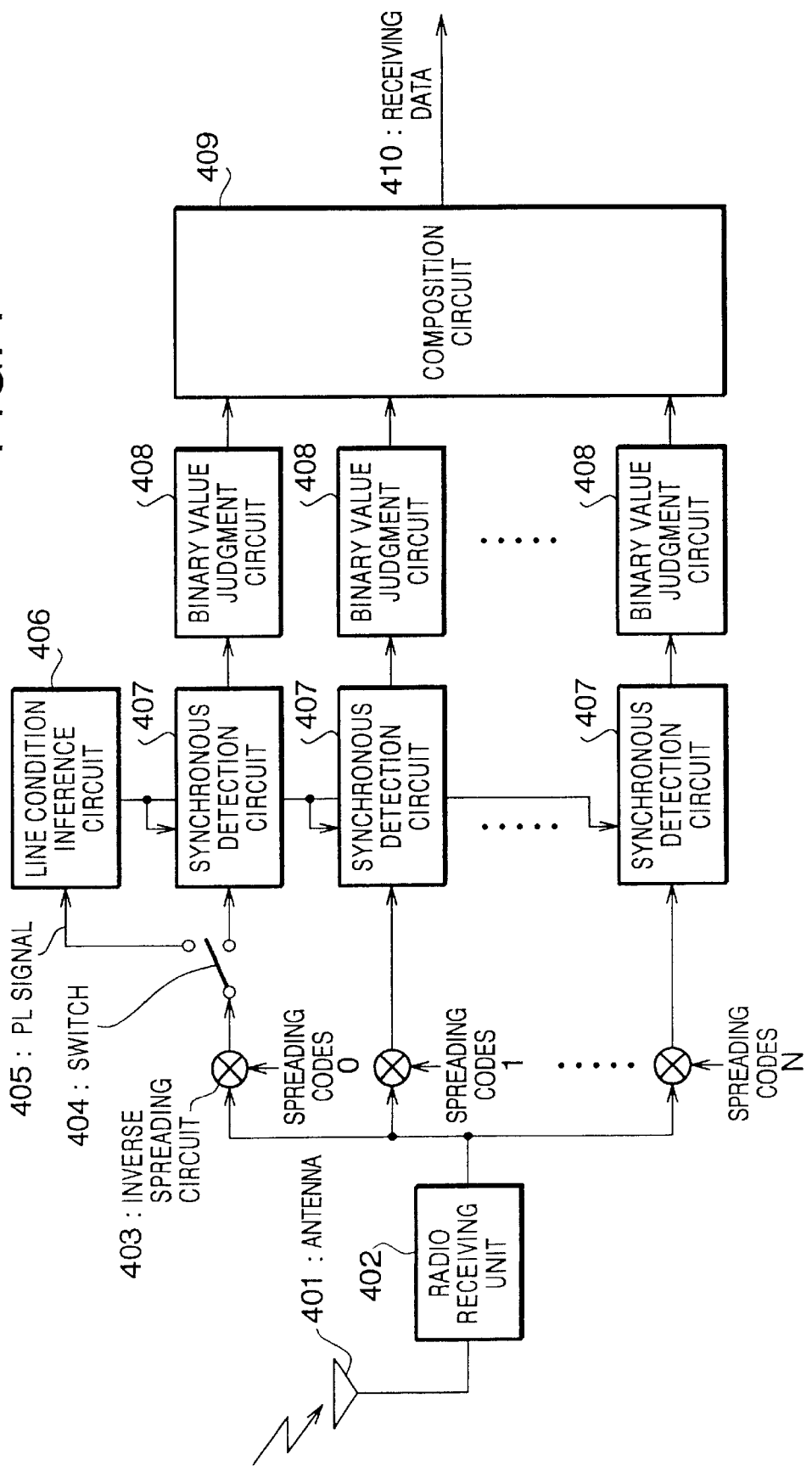
FIG. 7 is a block diagram, showing a constitution of a CDMA Radio Multiplex Receiving Device related to the second embodiment of the present invention.

FIG. 7 is a functional block of the CDMA radio multiplex receiving device in the second embodiment. The CDMA radio multiplex receiving device as shown in the figure is provided with an antenna 401, a radio receiving unit 402, a plurality of inverse spreading circuits 403 (403-0~403-N) connected in parallel with output from the radio receiving unit 402, a plurality of synchronous detection circuits 407 connected in parallel with output from each of the inverse spreading circuit 403, a line condition inference circuit 406 supplied with specific output from the inverse spreading circuit 403 via a switch 404, a plurality of binary determination circuits 408 connected in parallel with each output of the synchronizing circuit 407, and a composition circuit 409 connected with each output of the binary value judgment circuits 408.

In the CDMA radio multiplex receiving device constructed as described above, a signal received by the antenna 401 is down-converted by the radio receiving unit 402 and demodulated. Then it is inversely spread by the inverse spreading circuit 408, using each spreading code.

The pilot symbols (PL signal) is extracted from a signal inversely spread by the spreading code 0 via the switch 404. The switch 404 is connected with the line condition inference circuit 406 for a period alone that a PL signal 405 exists by synchronizing with the PL signal transmission period 201 as shown in FIG. 5 or FIG. 6. During the other period corresponding to the information data transmission period 202, the switch 404 is connected with the synchronous detection circuit 407. By controlling a connection end of the switch 404 as described above, the line condition inference circuit 406 can be supplied with the PL signal 405.

The line condition inference circuit 406 infers transfer function of a circuit on the basis of the PL signal 405 extracted from a inversely spread signal. And by using phases and the like of each symbol of the information data transmission period which are inferred in the line condition inference circuit 406, each channel is detected by the synchronous detection circuit 407. Furthermore, it is binary-valuated by a binary value determination circuit 408 and output as a receiving data 410 after being composed into one sequence data by the composition circuit 409.

According to the above described embodiment, in the multi code transmission, interference with the pilot symbols is eliminated by receiving the pilot symbols which is transmitted by only one spreading code. Also, a synchronous detection of all multiplexed channels can be executed by inferring a line condition by a highly reliable pilot symbols.

(The Third Embodiment)

Figure 8:
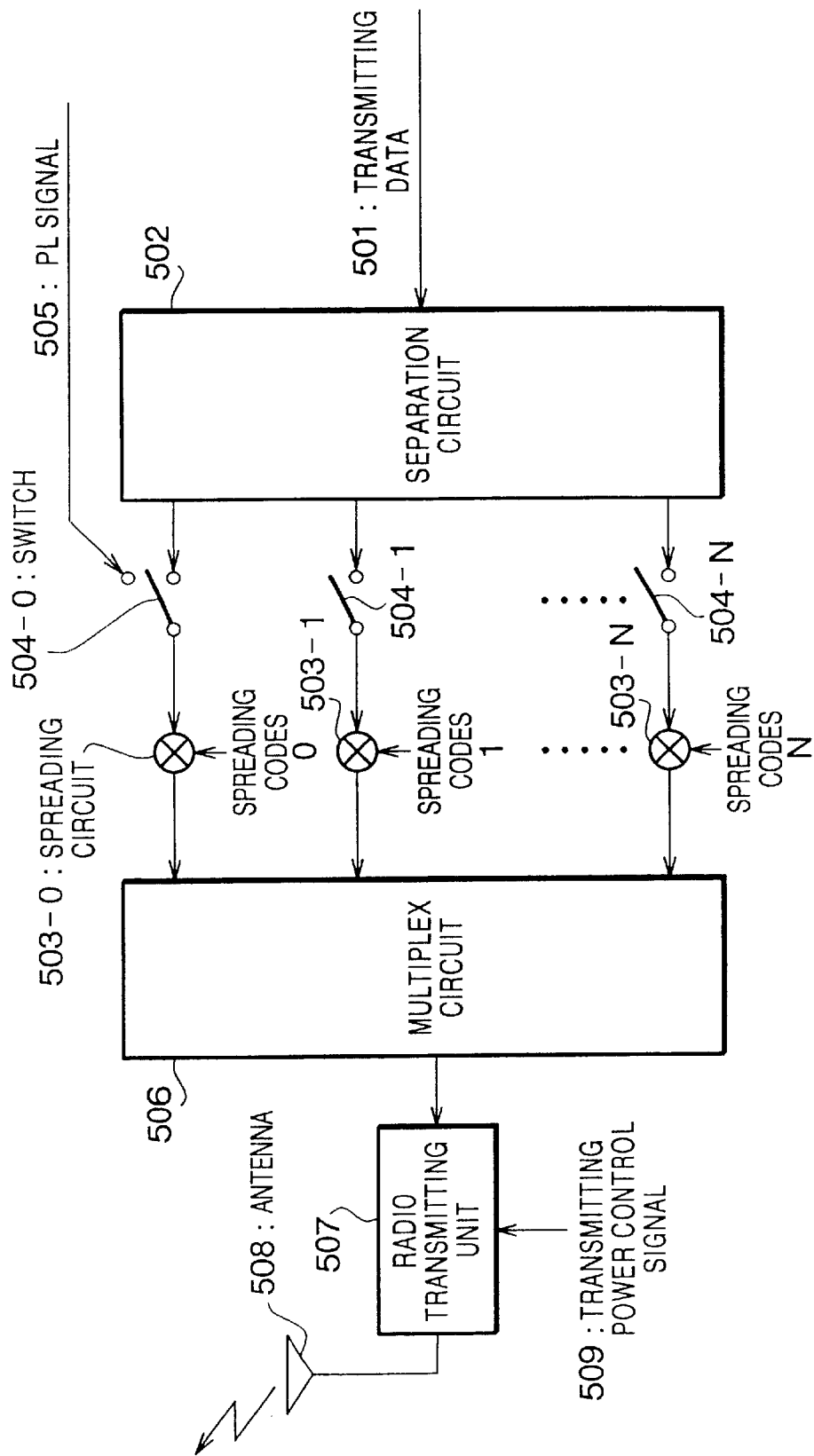
FIG. 8 is a block diagram, showing a constitution of a CDMA Radio Multiplex Receiving Device related to the third embodiment of the present invention.

FIG. 8 is a functional block of a CDMA radio multiplex transmitting device in a CDMA radio multiplex communicating device in the third embodiment according to the present invention. The third embodiment is so constituted that a transmitter power of the PL signal 505 is controlled by inputting a transmission control signal 502 into a radio transmitting unit 501 of the CDMA radio multiplex transmitting device. Except that the transmitter power of the PL signal is controlled by using a transmitter power control signal, it is identical in constitution with that of the first embodiment.

In the same manner with the first embodiment, the transmitting data 501 is separated into (N+1) channels by a separation circuit 502. Separated signals of each channel are spread by the spreading circuit 503 which has a different spreading code and multiplexed by the multiplex circuit 506. The pilot symbols (PL signal) 505 is inserted into a channel having a spreading code 0 by the switch 504 at an interval of T period. In a pilot symbols transmission period, there exists no transmitting signal of other channel. Hence, a transmitting signal existing in this section is only the pilot signal. Multiplexed signals are modulated by the radio transmitting unit 501 and transmitted by the antenna 508 after being up-converted to transmission frequency.

At this time, in the radio transmitting unit 501, a transmission is executed by making a transmitter power per channel of the pilot symbols transmission period stronger than other section by controlling the transmitter power periodically according to the transmitter power control signal 502. The operation of the receiving end is identical to that of the second embodiment.

According to the above described embodiment, because interference with the pilot symbols is relatively decreased, it is possible to enhance reliability of the pilot symbols, thereby improving a synchronous detection performance.

Further, as a method for transmitting by making a transmitter power of the pilot symbols transmission period stronger than other section, such a method can be considered as possible to realize the enhancement by that the pilot symbols signal 505 before being input to the spreading circuit 503-0 is made larger compared to a transmitting data signal, in addition to a method where the transmitter power is controlled by time.

For example, in the case where the transmitting data signal is considered as a binary value signal of ±1, if a pilot symbols signal 505 is treated as a signal of ±m and transmitted by spreading it as a signal of m times size, the pilot symbols is supposed to be transmitted by $m^2$ (=M) times power of the transmitter power per one channel of the transmitting data.

(The Fourth Embodiment)

The constitution of a CDMA radio multiplex transmitting device in the present embodiment is the same with that of the first embodiment. In FIG. 4, when a transmitting data 101 is separated by the separation circuit 102, it is separated into a control data and an information data (such as sound data, etc.) which are transmitted to the spreading circuit 103 as a different channel. However, if the transmitting data 101 is separated into two lines of the control data and the information data from the first to be input, there is no need to separate it again by the separation circuit 102. The operation thereafter is the same with that of the first embodiment.

Figure 9:
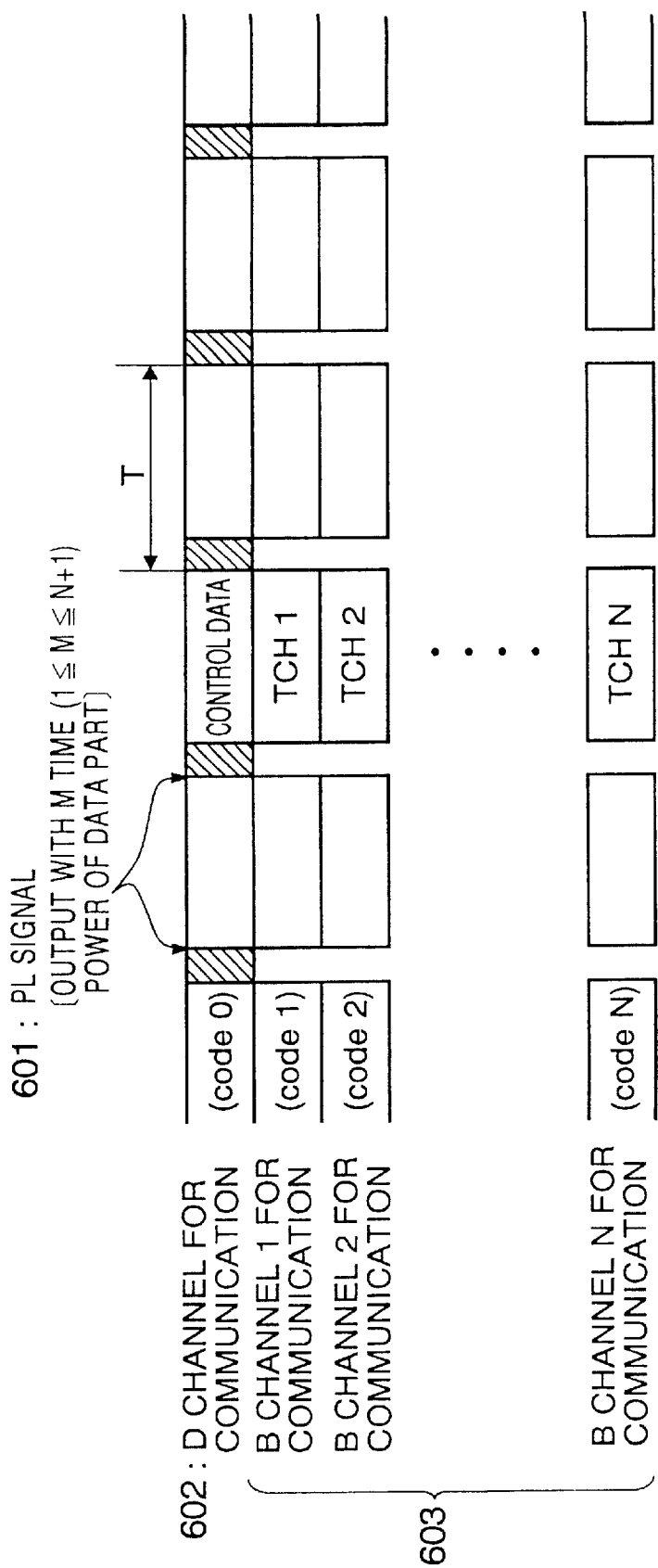
FIG. 9 is a mode type view, showing an example of a channel format in the forth embodiment of the present invention.

An example of channel format in the above described multi code transmission is shown in FIG. 9. It is the example where signals of (N+1) channels are multiplexed and a PL signal 601 of a spreading code 0 alone is transmitted with M times power of the data transmission period at an interval of T period. In this embodiment, multiplexed channels include a D channel 602 for communication which transmits the control data and a B channel 603 for communication which transmits the information data and, by using a spreading code 0 of the D channel, the PL signal 601 is transmitted.

In the case where the control data is transmitted by spreading it into each channel, transmitting speed of the control data changes according to a number of multiplexed channels. A system where capacity of the control data does not depend on the transmitting speed of the information data is not an efficient system.

On the contrary, in the system where the control transmitting data and the information data are transmitted by a different channel as the system described above, an efficient transmission of the control data is possible without any effect from a multiple number of the information data. Hence, by adapting a system which accommodates the information data of variously different speed, an efficient transmission of the multi code can be realized.

(The Fifth Embodiment)

Figure 10:
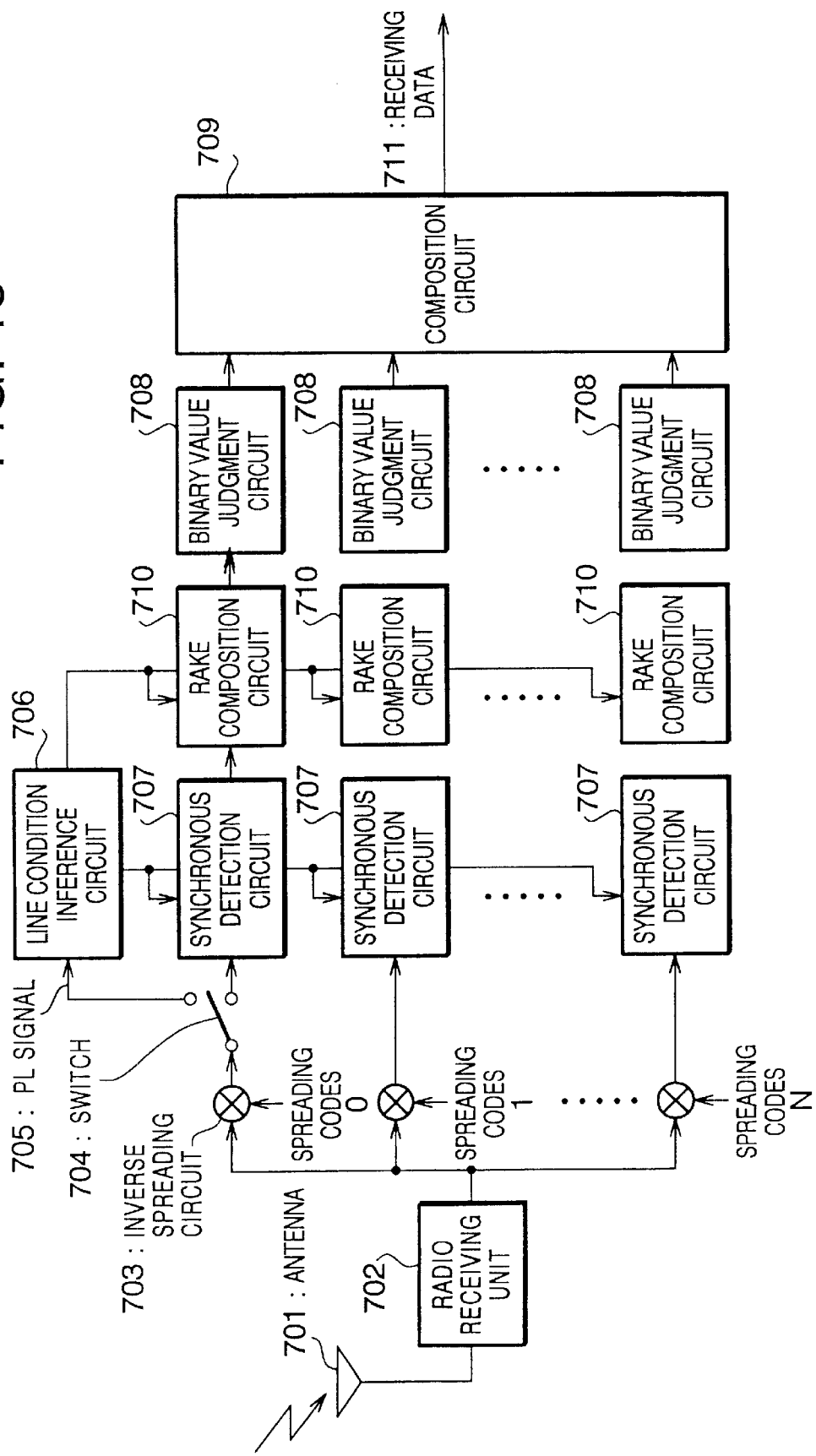
FIG. 10 is a block diagram, showing a constitution of a CDMA Radio Multiplex Receiving Device related to the fifth embodiment of the present invention.

A functional block of a CDMA radio multiplex receiving device in a CDMA radio multiplex transmitting device according to the present embodiment is shown in FIG. 10. The constitution of the CDMA radio multiplex transmitting device is the same with that of the first embodiment.

The present embodiment is so constituted that a RAKE composition circuit 710 is added to a device constitution as shown in the second embodiment. Therefore, except for the RAKE composition circuit 700 mentioned above, it is identical in constitution with FIG. 7.

In the CDMA radio multiplex receiving device according to the present embodiment, a signal received by the antenna 701 is inversely spread by the inverse spreading circuit 703 by using each spreading code after it is down-converted and demodulated by the radio receiving unit 702. The pilot symbols (PL signal) 705 is extracted from a signal inversely spread by the spreading code 0 via the switch 704 and, on the basis of the information thus obtained, transfer function of a circuit is inferred in the line condition inference circuit 706

At this time, the line condition inference circuit 706 not only infers phases of each symbol for a synchronous detection purpose, but it also sets or renews weighting factor of a delay line,etc. by treating the pilot symbols as a training signal necessary for the RAKE which is a path diversity. And by using phases, etc of each symbol of the inferred information data transmission period, each channel is detected by the synchronous detection circuit 707 and diversified by a RAKE composition circuit 710.

Further, it is binary-valuated by the binary determination circuit 708 and output as a receiving data 711 after it is composed into one data sequence by the composition circuit 709.

According to the above described embodiment, in the multi code transmission, by receiving the pilot symbols which is transmitted in one spreading code only, a line condition (transfer function) can be inferred and a synchronous detection of all multiplexed channels as well as a RAKE composition can be executed.

(The Sixth Embodiment)

Figure 11:
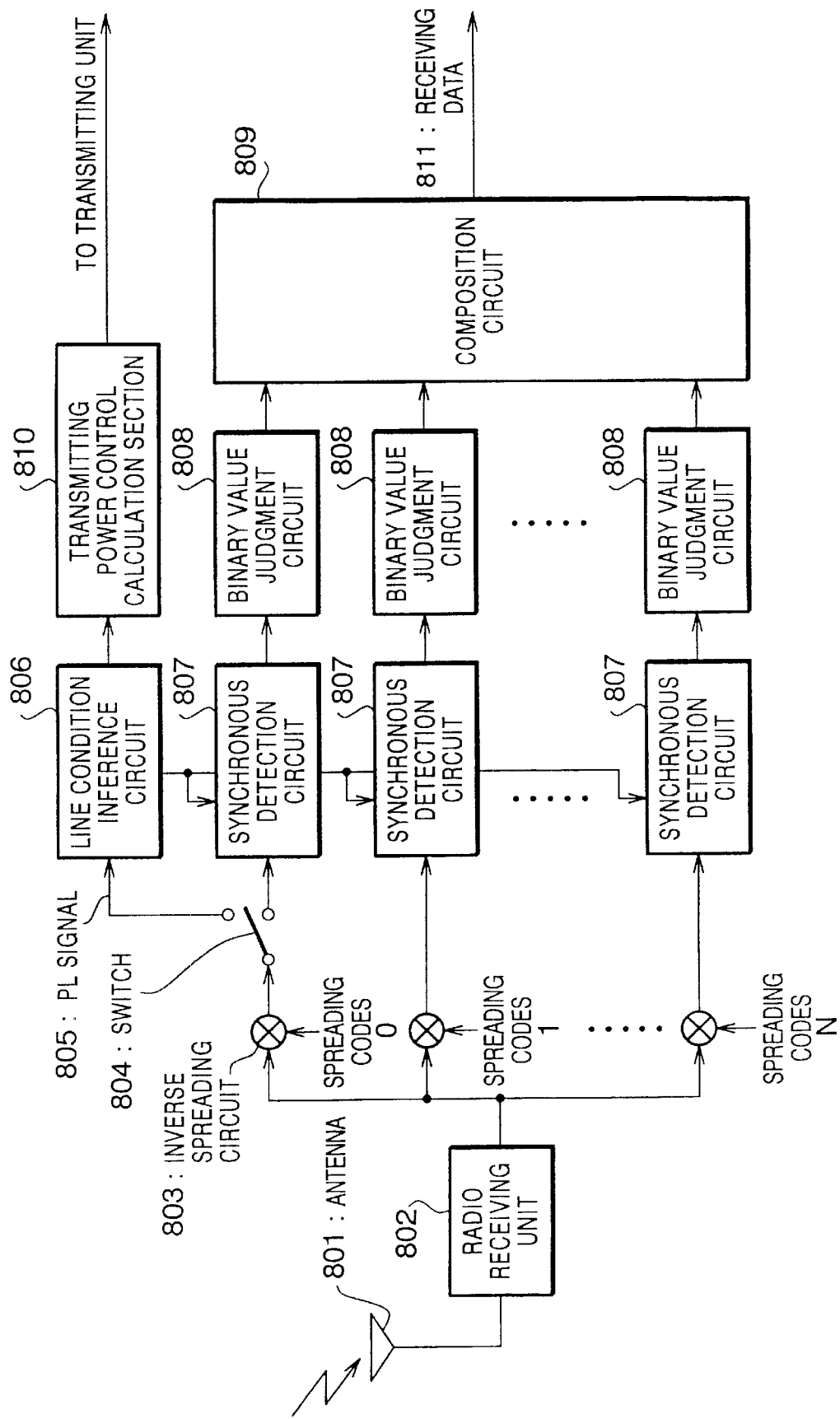
FIG. 11 is a block diagram, showing a constitution of a CDMA Radio Multiplex Receiving Device related to the sixth embodiment of the present invention.

A functional block of a CDMA radio multiplex receiving device in a CDMA radio multiplex transmitting device of the present embodiment is shown in FIG. 11. The constitution of the CDMA radio multiplexed transmitting device in this embodiment is the same with that of the first embodiment.

The present embodiment is so constituted that a transmitter power control calculation section 810 is added to a device constitution as shown in the second embodiment. Therefore, except for the transmitter power control calculation section 810, it is identical in constitution with that of FIG. 7.

In the CDMA radio multiplex receiving device in the present embodiment, a signal received by the antenna 801 is inversely spread by the inverse spreading circuit 803, using each spreading code after it is down-converted and demodulated by a radio receiving unit 802. The pilot symbols (PL signal) 805 is extracted from a signal inversely spread by the spreading code 0 via the switch 804 and, on the basis of the information thus obtained, transfer function of a line is inferred in the line condition inference circuit 806.

At this time, by obtaining a receiving power and INR (Signal to Interference—plus—Noise Ratio) in the line condition inference circuit 806, a transmitter power is calculated by the transmitter power control calculation section 810 and output to a transmitting unit.

While, a inverse spreading signal of each channel is detected by the synchronous detection circuit 807, using phases of each symbol inferred by the line condition inference circuit 806. Further, it is binary-valuated by the binary determination circuit 808 and output as a received data 810 after being composed into one data sequence by the composition circuit 809.

According to the above described embodiment, in the multi code transmission, by receiving a pilot symbols transmitted by only one spreading code, performance of the line condition (transfer function) inference is improved and a synchronous detection of all multiplex channels can be executed. At the same time, a highly effective transmitter power control can be executed.

(The Seventh Embodiment)

Figure 12:
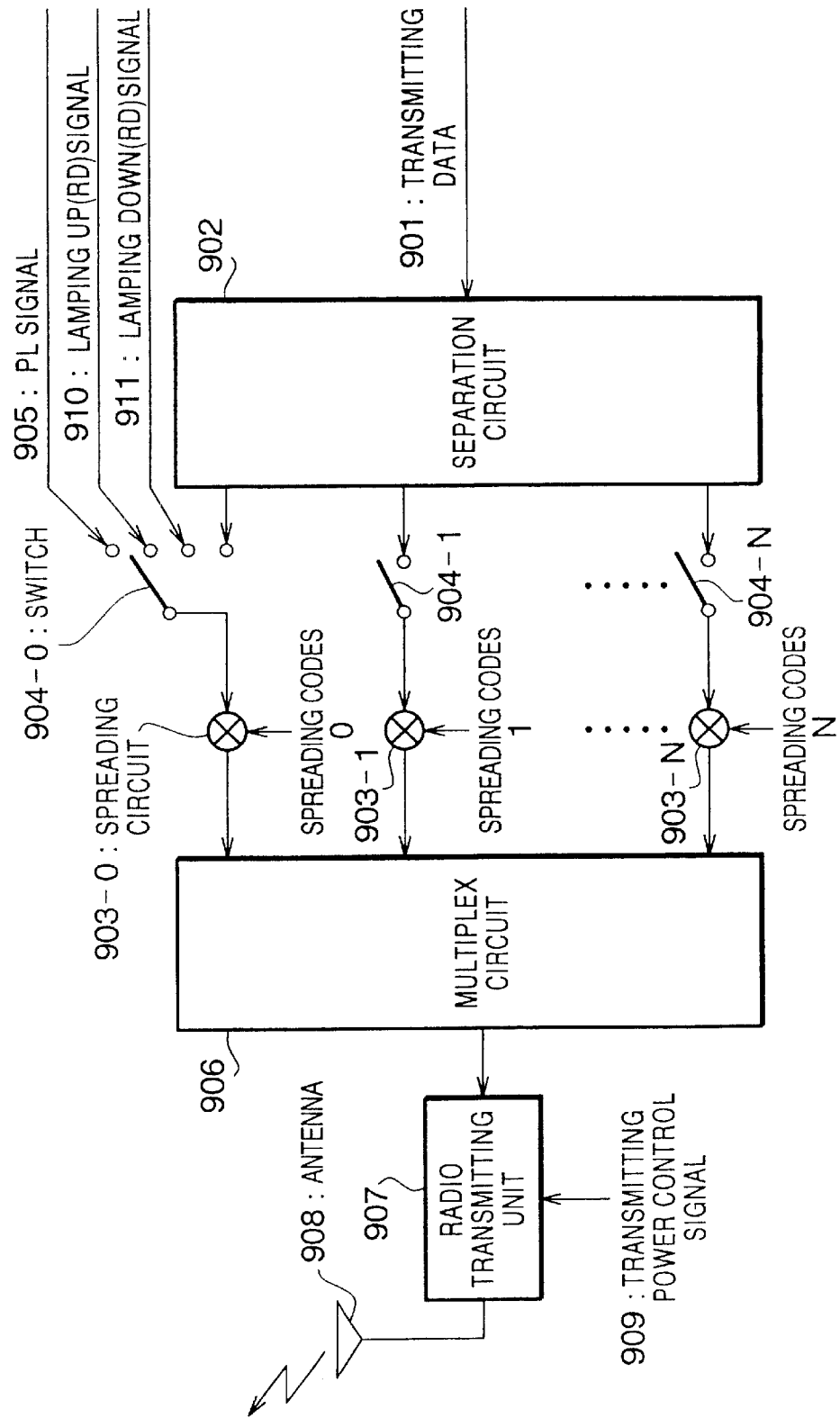
FIG. 12 is a block diagram, showing a constitution of a CDMA Radio Multiplex Transmitting Device related to the seventh embodiment of the present invention.

A functional block of a CDMA radio multiplex transmitting device in a CDMA radio multiplex transmitting device of the present embodiment is shown in FIG. 12. The constitution of the CDMA radio multiplex receiving device in the present embodiment is the same with that of the second embodiment.

The present embodiment is so constituted that the PL signal 905, a ramp up (RP) signal 910, a ramp down (RD) signal 911 and the transmitting data 901 can be selectively input to the spreading circuit 903-0. Therefore, it is provided with a switch 912. The object of the ramping signal is to prevent a spurious emission toward outside from a transmission band which is caused by a steep rise and fall of a signal in a burst transmission.

In the CDMA radio multiplex transmitting device as constituted above, the transmitting data 901 is separated into (N+1) channels by the separation circuit 902 in the same manner with that of the third embodiment. A separated signal of each channel is spread by the spreading circuits 9030~903-N having different spreading sings and multiplexed by the multiplex circuit 906.

The pilot symbols (PL signal) 905 is inserted into a channel (a spreading circuit 903-0) having a spreading code 0 by a switch 912 at an interval of T period. In the case of a burst signal, there is no necessity for the T period always to be fixed. The ramp up (RU) signal 910 is inserted at the starting time of the transmission period and the ramp down (RD) signal 911 is inserted at the closing time of the transmission period. A switchover of said signals is executed by the switch 912. In the pilot symbols and the ramping signal transmission periods, there exists no transmitting signal of other channel and therefore the channel alone of the spreading code 0 exists in the transmitting signal of these transmission periods.

Figure 13:
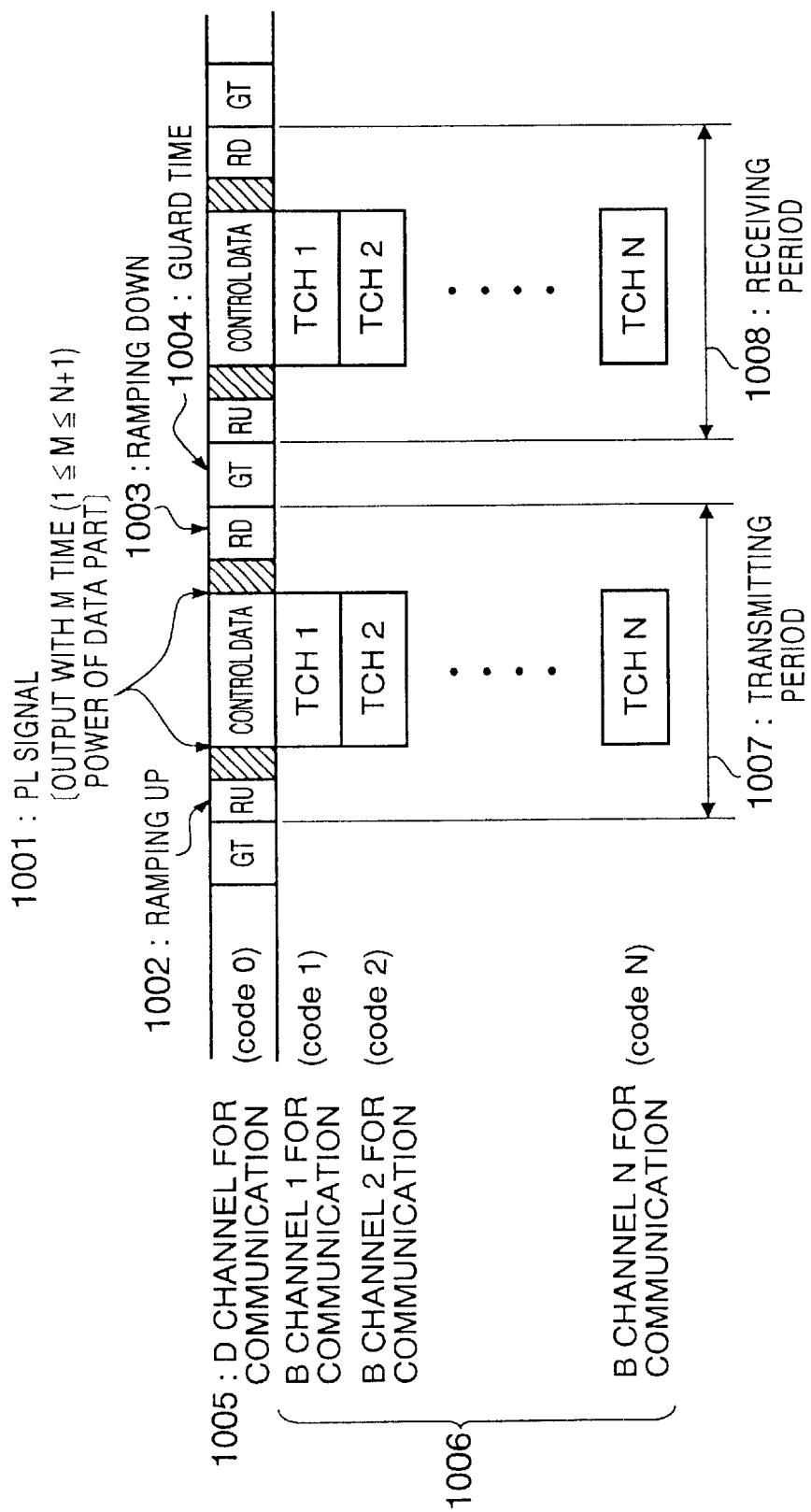
FIG. 13 is a model type view, showing an example of a channel format in the seventh embodiment.

A channel format example in the multi code transmission is shown in FIG. 13. This is one embodiment of the multi code transmission in CDM/TDD. In FIG. 13, 1001 is a PL signal, 102 is a ramp up signal, 1003 is a ramp down signal, 1004 is a guard time, 1005 is a D channel for communication, 1006 is a B channel for communication, 1007 is a transmission period and 1008 is a receiving section.

TDD is a system where the same radio frequency is time-shared for transmission/reception so as to make communication. Therefore, even in FIG. 13, the transmission period 1007 and the receiving section 1008 are time-shared. The guard time (GD) 1004 is a section for avoiding a collision between a transmitting signal and a receiving signal. In the present embodiment, the PL signal 1001 is inserted at the starting time and the closing time of the information data. When the transmission period is longer than a PL signal insertion period T, a plurality of PL signals will be inserted into the information data.

Signals multiplexed by the multiplex circuit 906 are modulated by the radio transmitting unit 901 and transmitted from the antenna 908 after being up-converted to transmitting frequency. At this time, in the radio transmitting unit 907, by making a transmission control periodically through the transmission power control signal 909, it is possible to transmit by making a transmission power of the pilot symbols transmission period stronger than a transmitter power per one channel of other section. The operation of the receiving end is the same with that of the second embodiment.

In FIG. 13, an example is shown where (N+1) channels are multiplexed and the PL signal 1001 is transmitted with M times ($1 \leq M \leq N+1$) of the transmission power per channel of the data transmission period. In the present embodiment, multiplexed channels include a D channel for communication 1005 which transmits a control data and a B channel for communication 1006 which transmit the information data and by using the spreading code 0 of the D channel a transmission of the PL signal 1001 is made. In the same manner, the ramp up (RU) signal 1002 at the starting time of the transmission period and the ramp down (RD) signal 1003 at the closing time of the transmission period are inserted into the D channel for communication and transmitted.

According to the above described embodiment, by transmitting not only the pilot symbols but also the ramping signal by one channel only in the multicode transmission of the burst transmission, simplification of a transmitting device can be realized. Also, in a propagation circumstance where a delay wave exceeds one symbol, the number of the spreading codes multiplexed in the ramp section is decreased and consequently the effect of interference (interrelation, etc.) given by a delay wave of the ramping signal to an adjacent symbol (which is a pilot symbols n the above described case) can be also decreased.

As described above in details, in the present invention, the transmitting end eliminates interference among the pilot symbols of each channel by transmitting the pilot symbols inserted into one channel only in multicode transmission. Also, in the synchronizing sequence system, by decreasing interference (interference among other stations), to the pilot symbols of other stations at the same time, interference performance of a line condition (transfer function) by the pilot symbols is improved. In addition, a synchronous detection performance of all multiplexed channels is improved. Further, it is also effective in that, by the improved performance of the inference of the line condition (transfer function) due to the pilot symbols, performance of the RAKE composition and a transmitter power control is enhanced.

(The Eighth Embodiment)

The constitution of a CDMA radio multiplex transmitting device in the present embodiment is the same with that of the first embodiment. In the first embodiment, there exists no transmitting signals of other channels in the pilot symbols insertion section and a transmitting signal that exists there is a pilot symbols only. On the contrary, in the present embodiment, the switch 104-0 for a channel having a spreading code 0 in FIG. 4 is switched over at an interval of T period, but switches 104-1~104-N for channels having spreading sings 1–N are not switched over and always in ON (connection) condition. The constitution of the CDMA radio multiplex receiving device is the same with that of the second embodiment.

Figure 14:
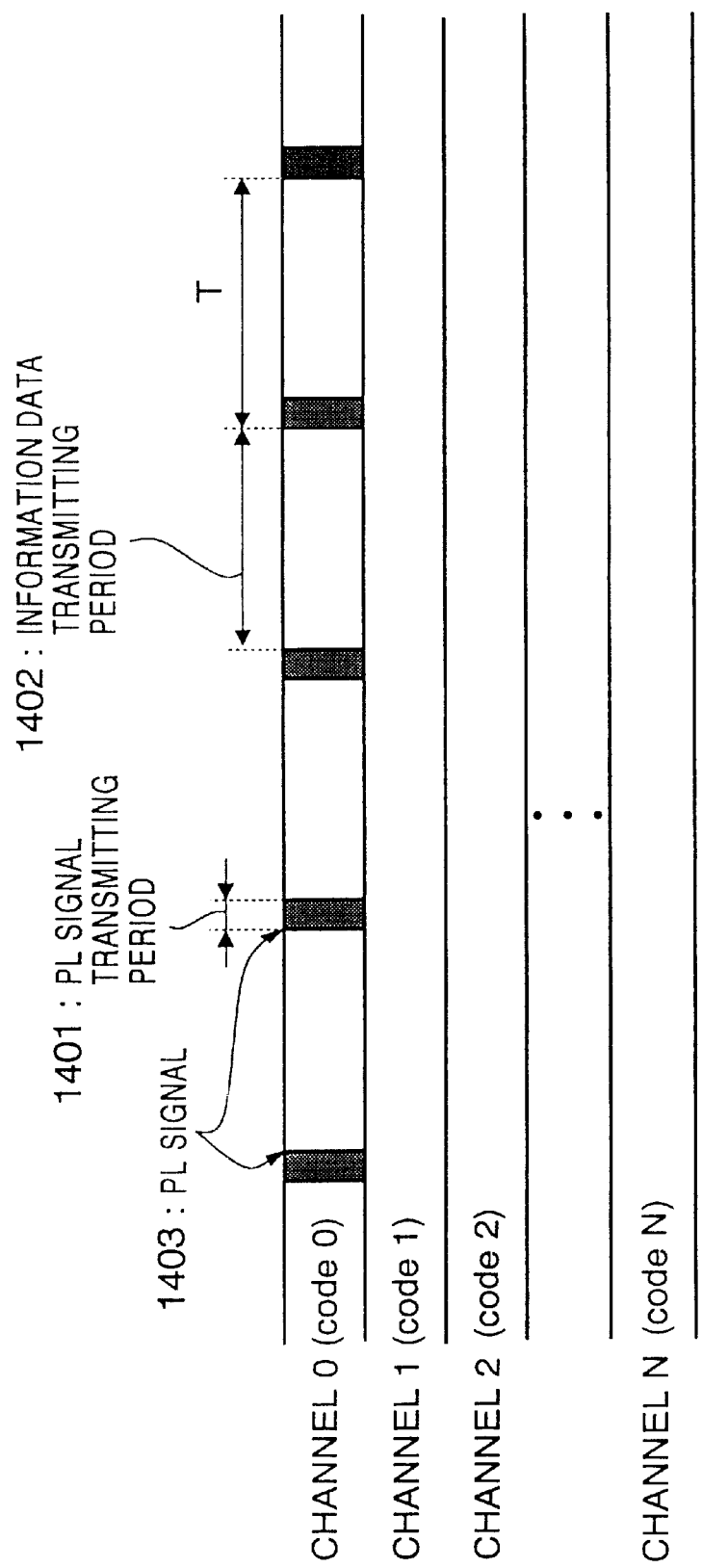
FIG. 14 is a model type view, showing an example of a channel format in the eighth embodiment.

FIG. 14 shows an example of a channel format in the multicode transmission of the present embodiment. A channel 0 is composed of a PL signal transmission period 1401 and an information data transmission period 1402 in T period. A PL signal 1403 is inserted into a PL signal transmission period 1401. Signals of (N+1) channels are multiplexed and a PL signal of a spreading code 0 is transmitted at an interval of T period. At the same time, an information data is transmitted in other channel.

In the case where the data of spread (N+1) channels are transmitted from the radio transmitting unit 107 after they are separated into two orthogonalized phases (I, Q) to be multiplexed in the multiplex circuit 106, a signal which is multiplexed and transmitted in the same phase with the channel 0 including the PL signal interfere with the PL signal. At this time, a signal of other channel which is multiplexed and transmitted in another orthogonalized phase does not interfere with the PL signal because it is orthogonalized. If not so, even in the case where an orthogonalized relation is not complete due to a delay wave existing, interference turns out only small. For this reason, it is possible to reduce interference and reliability of the pilot symbols can be enhanced. Further, since it is all right to arrange the PL signal in one code only, transmitting efficiency in the multi code transmission can be enhanced because the information data can be transmitted to the PL signal transmission period 1401 in other channels.

Also, at a receiving end, in the same manner with that of the second embodiment, a synchronous detection can be executed for all multiplexed channels by inferring a line condition from the pilot symbols of the channel 0.

Further, in the present embodiment, it is apparent that, in the same manner with the fourth embodiment, it is possible to distinguish a transmitting data from a control data as well as an information data and transmit it from a different channel.

In a cellular system where a radio communication of a CDMA system is made between a base station device and a mobile station device moving in cell, a highly reliable pilot symbols can be transmitted and received by providing the base station device and the mobile station device with a CDMA radio multiplex communication device as described above in the first till the eighth embodiments.

The present invention is not limited to a cellular system, but can be applied to the multicode transmission of variously different radio communication systems.

What is claimed is:

1. A CDMA transmission apparatus comprising:
   a separating system that separates transmitting data into a plurality of channels;
   an inserting system that periodically inserts a pilot signal into a channel other than the plurality of channels;
   a spreading system that spreads a transmitting data signal on each of the plurality of channels and the pilot signal on the pilot signal channel according to a different spreading code for each channel;
   a multiplexer that multiplexes the spread transmitting data signals; and
   a transmitter that transmits the multiplexed transmitting data signals and the pilot signal in a time division multiplexing manner, the pilot signal being transmitted in a first interval and the multiplexed transmitting data signals being transmitted in another interval;
   wherein a transmission power per channel of the transmitter during the first interval is greater than a transmission power per channel of the transmitter during the other interval.

2. The CDMA transmission apparatus according to claim 1, further comprising:
   a dividing system that divides the transmitting data into control data and information data, wherein the separating system separates the control data into the channel into which the pilot signal has been inserted.

3. The CDMA transmission apparatus according to claim 1, wherein, in one of a burst transmission in a TDD transmission and an intermittent transmission, a ramping signal is transmitted by the pilot signal channel into which the pilot signal is inserted.

4. A CDMA transmission apparatus comprising:
   a separating system that separates transmitting data into a plurality of data;
   a first spreading system that spreads the separated plurality of data according to a first spreading code;
   a second spreading system that spreads a pilot signal according to a second spreading code different from the first spreading code; and
   a multiplexer that multiplexes the spread pilot signal and the spread plurality of data so that only the spread pilot signal is periodically transmitted at a first time interval;
   wherein the pilot signal is transmitted at a transmission power greater than a transmission power per channel at which the plurality of data is transmitted.

5. The CDMA transmission apparatus according to claim 4, wherein the multiplexer further multiplexes the spread plurality of data and a control data signal, separate from the pilot signal and the transmitting data, so that only the control data signal is periodically transmitted at a second time interval different from the first time interval.

6. The CDMA transmission apparatus according to claim 4, wherein said first spreading system spreads each of the separated data according to a corresponding one of a plurality of different spreading codes.

7. The CDMA transmission apparatus according to claim 4, wherein the separated transmitting is code multiplexed.

8. The CDMA transmission apparatus according to claim 4, further comprising:
   a transmitter that transmits signals multiplexed by said multiplexer by a predetermined transmission power, wherein said transmitter transmits the transmitting data and the pilot symbol so that a power at each interval of the transmitting data is equal to a power at each interval of the pilot symbol.

9. A CDMA radio multiplexing communication apparatus comprising a transmitting side and a receiving side,
   the transmitting side comprising:
      a separating system that separates transmitting data into a plurality of channels;
      an inserting system that periodically inserts a pilot signal into a channel other than the plurality of channels;
      a spreading system that spreads a transmitting data signal on each of the plurality of channels and the pilot signal on the pilot signal channel according to a different spreading code;
      a multiplexer that multiplexes the spread transmitting data signals; and
      a transmitter that transmits the multiplexed transmitting data signals and the pilot signal in a time division multiplexing manner, the pilot signal being transmitted in a first interval and the multiplexed transmitting data signals being transmitted in another interval;
      wherein a transmission power per channel of the transmitter during the first interval is greater than a transmission power per channel of the transmitter during the other interval; and
   the receiving side comprising:
      a receiver that receives a radio signal;
      a despreading system that despreads the received radio signal according to the plurality of different spreading codes;
      an extracting system that extracts the pilot signal from the despread signal;
      an estimating system that estimates a transfer function from the extracted pilot signal;
      a detecting system that detects the despread signal by coherent detection; and
      a combining system that combines a plurality of channels from the detected signal.

10. The CDMA radio multiplexing communication apparatus according to claim 9, the transmitting side further comprising:
    a dividing system that divides the transmitting data into control data and information data, wherein the separating system separates the control data into the channel into which the pilot signal has been inserted.

11. The CDMA radio multiplexing communication apparatus according to claim 9, the receiving side further comprising:
    a RAKE combining system that performs RAKE combining, wherein the RAKE combining is performed while estimating a condition of the plurality of channels from the pilot symbol.

12. The CDMA radio multiplexing communication apparatus according to claim 9, wherein one of a condition of the plurality of channels and a communication quality is estimated on the receiving side by obtaining one of a received power and a SINR (Signal to Interference-plus-Noise Ratio) from the pilot symbol.

13. The CDMA transmission apparatus according to claim 1, in combination with a CDMA reception apparatus, the CDMA reception apparatus being configured to receive a radio signal from the CDMA transmission apparatus.

14. The CDMA transmission apparatus according to claim 1, in combination with a CDMA reception apparatus, the reception apparatus comprising:

a receiver that receives a radio signal transmitted from the CDMA transmission apparatus;

a despreading system that despreads the received signal into a plurality of signals in accordance with the plurality of different spreading codes;

an extracting system that extracts the pilot signal from the despread received signal;

an estimating system that estimates a transfer function from the extracted pilot signal;

a detecting system that detects the plurality of despread signals by coherent detection; and a combiner that combines the plurality of detected signals.

15. The CDMA transmission apparatus according to claim 1, in combination with a CDMA reception apparatus, the reception apparatus comprising:

a receiver that receives a radio signal transmitted from the CDMA transmission apparatus; and a RAKE combining system that performs RAKE combining for the received radio signal, wherein the RAKE combining is performed while estimating a condition of a channel from the pilot signal.

16. The CDMA transmission apparatus according to claim 1, in combination with a CDMA reception apparatus, the reception apparatus comprising:

a receiver that receives a radio signal transmitted from the CDMA transmission apparatus; and an estimating system that estimates one of a condition of a channel and a communication quality by obtaining one of a received power and a SINR (Signal to Interference-plus-Noise Ratio) from the pilot signal.

17. A CDMA reception apparatus comprising:

a receiver that received a data signal that is spread with a first spreading code and a pilot signal that is spread with a second spreading code different from the first spreading code;

a first despreading system that despreads the spread data signal;

a second despreading system that despreads the spread pilot signal;

a coherent detector that coherently detects using the despread pilot signal, the despread data signal received by the receiver; and;

a RAKE combiner that combines the coherent detected signal.

18. The CDMA reception apparatus according to claim 17, further comprising:

a channel quality estimating system that estimates one of a communication quality and a condition of at least one channel using the despread pilot signal.

* * * * *

UNITED STATES PATENT AND TRADEMARK OFFICE
CERTIFICATE OF CORRECTION

PATENT NO. : 6,370,131 B1 Page 1 of 1
DATED : April 9, 2002
INVENTOR(S) : Kazuyuki Miya It is certified that error appears in the above-identified patent and that said Letters Patent is hereby corrected as shown below:

Column 11,
Line 67, "is" should be -- data are --.

Signed and Sealed this

Eighth Day of October, 2002

*Attest:*

JAMES E. ROGAN
*Attesting Officer*     *Director of the United States Patent and Trademark Office*